United States Patent [19]
Sukhu et al.

[11] Patent Number: 5,771,440
[45] Date of Patent: Jun. 23, 1998

[54] COMMUNICATION DEVICE WITH DYNAMIC ECHO SUPPRESSION AND BACKGROUND NOISE ESTIMATION

[75] Inventors: Anand Sukhu, Sunrise; Patrick Doran, Plantation, both of Fla.

[73] Assignee: Motorola, Inc., Schaumburg, Ill.

[21] Appl. No.: 657,837

[22] Filed: May 31, 1996

[51] Int. Cl.[6] .............................. H04B 1/10; H04M 1/00
[52] U.S. Cl. ............................ 455/63; 455/78; 379/406; 379/410; 381/83; 381/93; 381/94; 381/57
[58] Field of Search ......................... 455/63, 78; 381/83, 381/93, 94, 95, 57; 379/58–60, 406, 407, 410

[56] References Cited

U.S. PATENT DOCUMENTS

| | | | |
|---|---|---|---|
| 4,165,449 | 8/1979 | Vachon | 379/409 |
| 5,307,405 | 4/1994 | Sih | 379/410 |
| 5,390,250 | 2/1995 | Janse et al. | 379/410 |
| 5,434,916 | 7/1995 | Hasegawa | 379/406 |
| 5,602,913 | 2/1997 | Lee et al. | 379/406 |

FOREIGN PATENT DOCUMENTS 2256351  7/1995  United Kingdom.

*Primary Examiner*—Donnie L. Crosland
*Attorney, Agent, or Firm*—M. Mansour Ghomeshi

[57] ABSTRACT

Echo suppression is accomplished by comparing the ratio of the microphone (101) and speaker (121) energies to a dynamic threshold that varies with the background noise (310) at a second communication device (130), and transmitting locally generated noise when the potential for echo exists. The use of the dynamic threshold provides for echo suppression with significantly better doubletalk performance.

18 Claims, 3 Drawing Sheets

COMMUNICATION DEVICE WITH DYNAMIC ECHO SUPPRESSION AND BACKGROUND NOISE ESTIMATION

TECHNICAL FIELD

This invention is generally related to communication devices and more particularly with suppressing echo in communication devices.

BACKGROUND

Radio communication devices used in wireless communication suffer from an acoustic feedback problem (echo return) that occurs when audio signals couple from the radio earpiece to the microphone. Some established systems, such as the Groupe Special Mobile (GSM) cellular radio system has strict requirements for echo return loss. As an example, the GSM specification requires that the echo return loss be less than or equal to 46 dB. With a good mechanical design of handset, the acoustic coupling from the earpiece to the microphone should be able to meet this requirement of a 46 dB difference. It is desirable, however, to provide a volume control to increase the handset audio output by 10 dB. When the earpiece output is increased by 10 dB, the echo return loss is only 36 dB. In addition, the maximum echo delay for an acoustic signal originating from a person connected to the public services telephone network (PSTN) and being returned as echo by virtue of acoustic coupling between the earpiece and the microphone should be 180 milliseconds. In practice, substantially greater delays will be introduced, depending on the transmission route. For example, a satellite connection could introduce delays of 400 milliseconds. This echo is disturbing to the ear of the receiver connected to the Public Switch Telephone Network (PSTN).

One solution to this problem may be found in the British patent number CE30020C entitled "Enhancement of Echo Return Loss", assigned to Motorola Inc. This patent teaches a mechanism by which echo is suppressed using an energy comparison at the speaker and microphone ports. This energy comparison utilizes a fixed threshold in estimating the amount of echo desired to be suppressed. One tradeoff with the above approach is degradation of doubletalk. Doubletalk, sometimes referred to as full duplex mode, is the ability of both parties to speak simultaneously and each to be heard by the other party. Consider a call between a first party on a landline telephone and a second party on a cellular phone with echo suppression. During the period that both parties are speaking and whenever the above relation between uplink and downlink energies is violated on the second party's end, the first party (landline) receives comfort noise instead of second party's audio due to the function of second party's echo suppressor. As a result, true full duplex operation is compromised.

A need therefore exists for a mechanism by which echo suppression is accomplished without the degradation associated with the prior art.

DETAILED DESCRIPTION OF THE PREFERRED EMBODIMENT

Echo suppression is accomplished in the prior art by estimating the uplink and downlink audio energies. A comparison is made on these relative energies to a fixed threshold and a decision is made whether to substitute comfort noise in the uplink signal. Since this threshold is fixed and is optimized for the highest user volume setting (worst case echo condition), and in particular does not depend on the volume setting, a degradation in doubletalk is experienced at lower volume settings. To overcome the deficiencies of the prior art, the present invention changes the threshold dynamically as the volume setting changes. This dynamic threshold provides for a significantly better echo suppression and one that improves the doubletalk performance.

Figure 1:
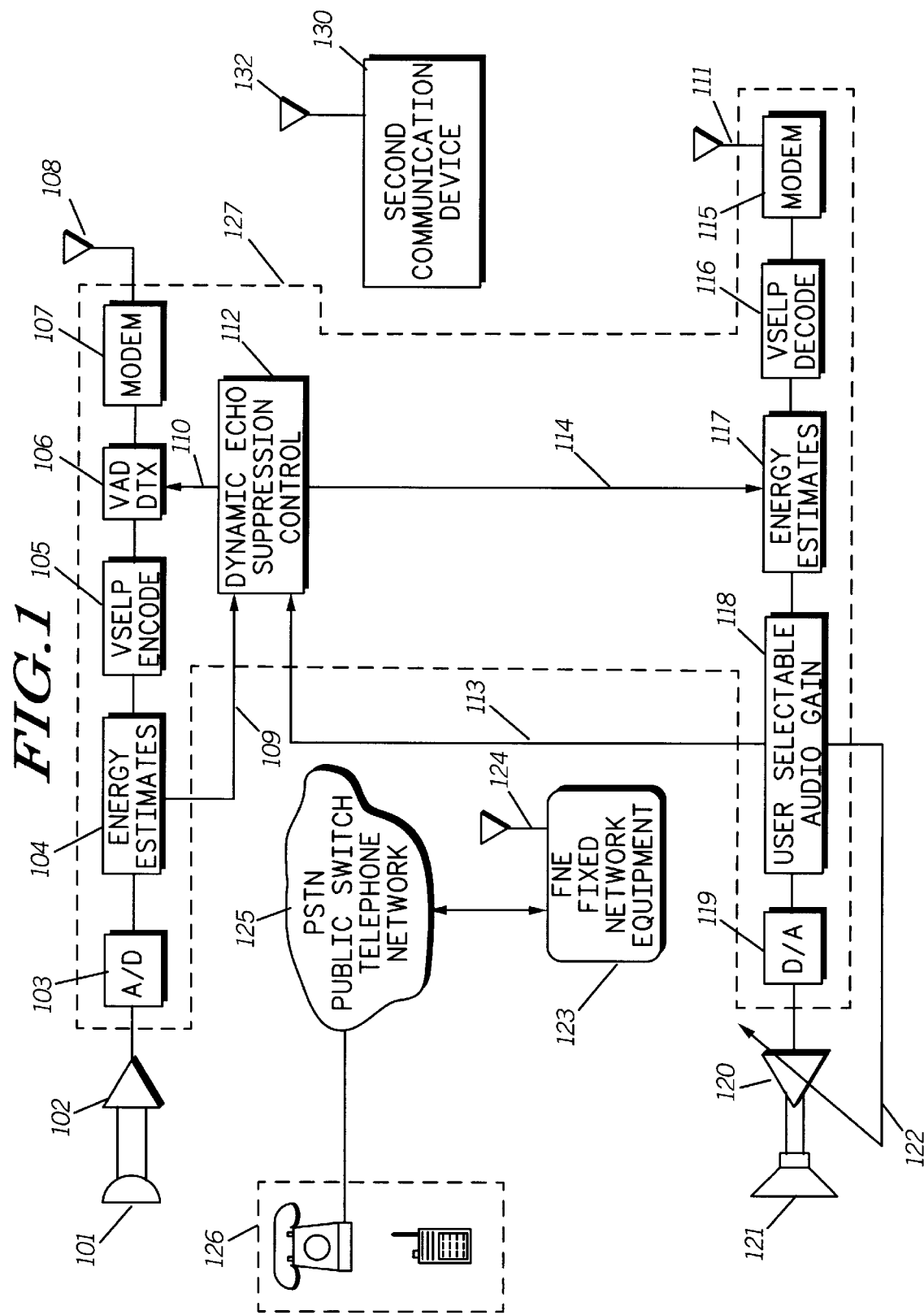
FIG. 1 shows a block diagram of a communication system in accordance with the present invention.
Figure 2:
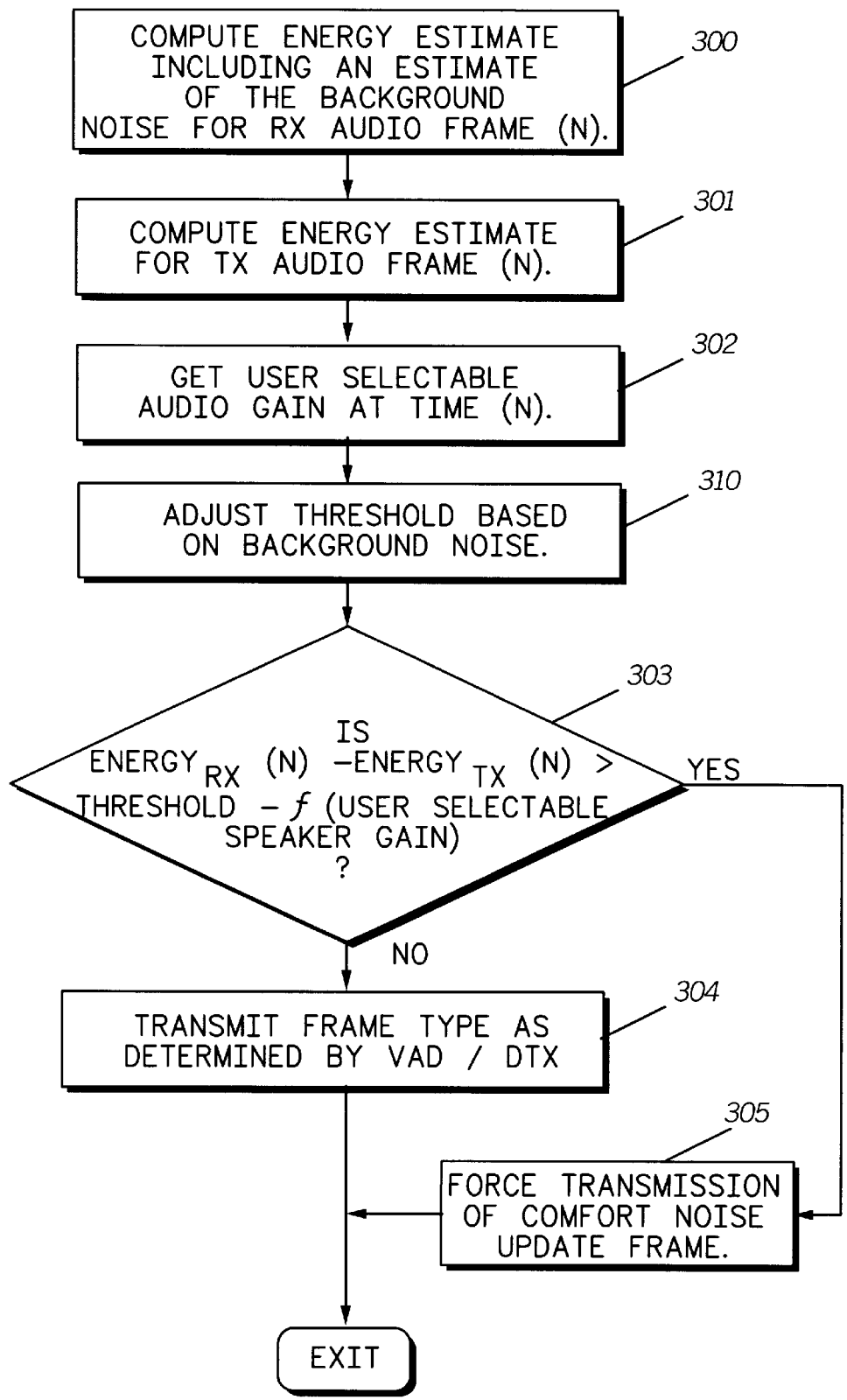
FIG. 2 shows a flow chart of the operation of the communication device of the present invention.

The principles of the present invention will be better understood by referring to a series of drawings where like numerals are carried forward. Referring to FIGS. 1 and 2 concurrently, a block diagram and a flow chart of the operation of a communication system 100 in accordance with the present invention are shown, respectively. The system 100 includes a first communication device shown to include a receiver 115 for producing a receive audio signal, a decoder 116, a control device 118 for selectively altering the amplitude of the receive audio signals, a transmitter 107, an encoder 105, an audio input device 101 and an echo suppression control 112 for minimizing the effect of the receive audio signal on the microphone 101. The system 100 also includes a landline switching station PSTN (Public Station Telephone Network) 125 which is connected to a wired telephone 126. The system 100 further includes a central station such as a Fixed Network Equipment (FNE) 123 with its associated antenna 124. A second communication device 130 and its associated antenna 132 is shown to represent one of the communication devices in the system 100 that communicate to the first communication device. The central station 123 helps to coordinate the communication between the various communication devices in the system 100. The operation of these various components follows.

An audio signal is detected by a microphone 101 and is amplified by an amplifier 102 having a fixed gain before being sampled by an analog-to-digital converter 103. An energy estimate is computed on that uplink frame (301,104). The energies are estimated recursively according to the following formula:

$$E[n]=(*-\beta)*E[n-1]+\beta*(x[n])^2$$

where β is a constant less than 1, x[n] is the current audio sample, E[n−1] is the previous estimate of the recursive energy and E[n] is the current estimate of the recursive energy.

The energy estimate is provided to a dynamic echo suppressor 112 through a control line 109. The energy estimates are also supplied to a Vector Sum Excited Linear Predictor (VSELP) encoder 105. This vocoder 105 performs a VSELP encode on the audio frame. A decision is made as to whether voice activity has been detected in that encoded frame 303. A voice Activity Detector (VAD) and a Discontinuous Transmit detector 106 is used to provide this information. The encoded frame is then transmitted via an RF modem (radio frequency transmitter) 107 and antenna (108).

On the receive path, the RF signal is detected by a receive antenna 111 and demodulated by a modem (radio frequency receiver) 115. This modem 115 may be a receiver as is known in the art. The received frame is VSELP decoded by a vocoder 116 which outputs downlink received audio samples. An energy estimate, including an estimate of the background noise of the environment in which the second communication device is operating, is then made on the downlink audio samples (300,117). This collection of information is fed to the echo suppressor 112 via control line 114. The audio samples are then passed through a second amplifier stage comprising a user volume control or other selectable audio gain control 118, an amplifier 120 and link 122. This signal is converted from digital to analog via a Digital to Analog converter (D/A) 119 before it is amplified by the amplifier 120. The amplified audio is played out on a speaker 121.

As mentioned, the gain stage consists of a digital gain block 118 that decodes the user selected (volume) audio level and converts this into a signal that is used to control the analog gain 120 via control line 122. The echo suppressor control 112 takes the control information (the energy estimates of both paths) and uses these to determine if an echo condition exists 303. In accordance with the principles of the present invention a control line 113 from the user selectable audio gain block 118 is routed to the dynamic echo suppressor control block 112. This control line 113 provides information on what user selected audio gain is active. In other words, this control line provides the suppressor 112 with a sense of the volume setting. With this information, the dynamic echo suppressor 112 can compute dynamic offsets for each user selectable audio gain 302, thereby providing the maximum level of doubletalk while eliminating the echo (303 and305).

In addition to the volume control participation in the dynamic suppression of the echo, the procedure alters the doubletalk threshold based on the level of background noise estimated at 117. This is accomplished via block 310. The echo suppression algorithm aims to avoid oversuppression that may result when the background noise at the second communication device is too high. In order to accomplish this goal, the estimate of the background noise is used to vary the doubletalk threshold. To better understand this aspect of the present invention, we refer to FIGS. 3 and 4 concurrently.

Figure 3:
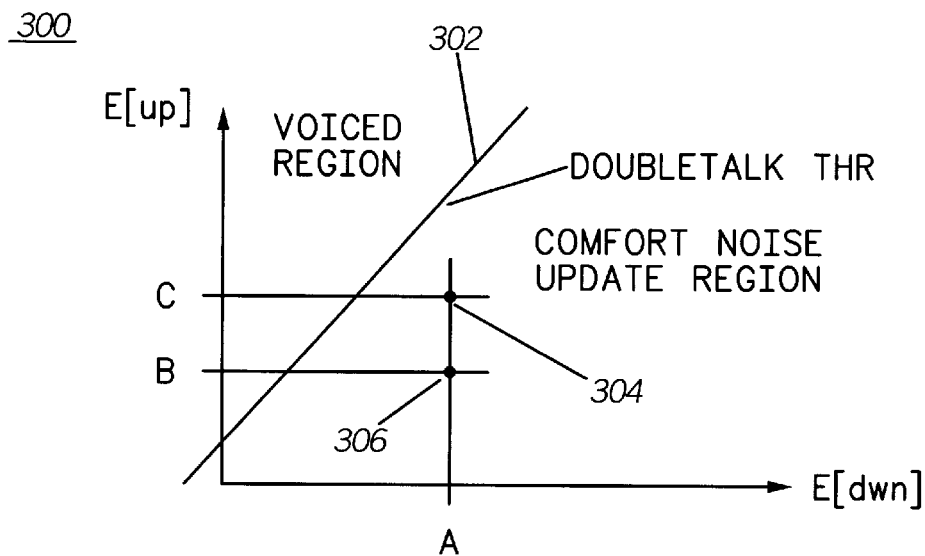
FIG. 3 shows a graph representing the doubletalk threshold of a first communication device operating in the communication system in accordance with the present invention.
Figure 4:
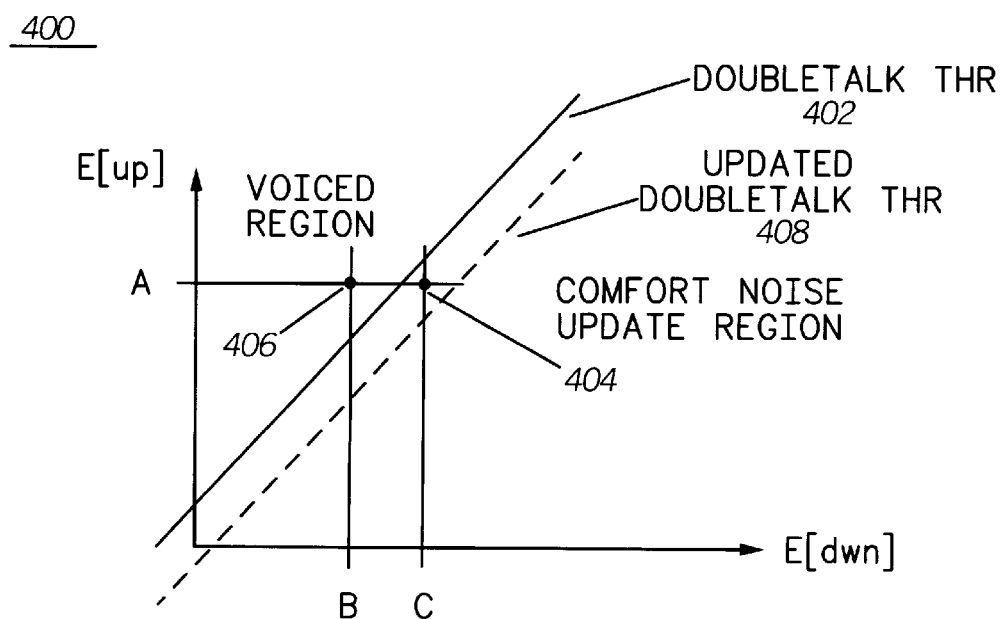
FIG. 4 shows a graph representing the doubletalk threshold of a second communication device operating in the communication system in accordance with the present invention.

FIG. 3 shows the doubletalk threshold chart at the second communication device 130 (listener) which for our purposes is listening to the information being received from the first communication device (talker). As mentioned, the goal is to alter the threshold as the background noise level at the listener device 130 changes. On this graph, the doubletalk threshold is shown by 302. The voice region and the comfort noise regions are above and below the threshold 302, respectively. FIG. 4 shows two doubletalk thresholds at the talker device. When the background noise at the listener device 130 increases from B to C the comfort noise components change from 306 to 304, respectively to reflect this increase. At the talker graph 300, the threshold 402 detects this increase as voice and proceeds to suppress the audio input path in order to minimize echo. This is undesired because the increase in the volume was caused by increased background noise and not voice. The present invention overcomes this problem by actively moving the threshold line to accommodate increases in audio level due to background noise. As such, when the background noise moves from 306 to 304 so does move the threshold from 402 to 408. Correspondingly, the energy level shown by 406 falls within the threshold and echo suppression is avoided. Consequently, the audio signal is sent back from the talker without it being interleaved with comfort noise that would have otherwise occurred by the increased background noise.

In essence, by providing a path between the audio control device 118 and the suppressor 112, the latter can suppress the echo on the audio return path commnensurate with the amplitude of the audio signal and the level of background noise at the second communication device 130. This is in contrast with the prior art in that it accommodates different volume settings and it accounts for increased background noise. By incorporating the setting of the volume control and the level of background noise, the echo suppression is prevented from degrading the performance of the doubletalk, hence improved full duplex operation. In other words, by allowing the selective altering of the amplitude of the audio on the audio output path to be incorporated in the decision on how much to suppress the echo on the audio input path, the user will be able to receive minimum echo and yet enjoy improved full duplex operation. Indeed, the incidence of doubletalk becomes greater as the user selectable audio gain becomes less. That is, as the amplitude of the audio signal getting to the audio output device is lowered, so will there be an improvement in the performance of doubletalk.

In the preferred embodiment, a Digital Signal Processor (DSP) 127 is used to realize a number of components in the communication device. The simple program outlined below may be used to implement the above incorporation of the volume setting.

IF 10 log(Euplink/Edownlink)>Threshold +dynamic_offset
  transmit normal voice frame
ELSE p2 force transmission of a Comfort Noise (CN) update frame
END In the preferred embodiment, the user selectable gain values are associated with a fixed table stored in a memory component (not shown). These values are translated into digital 118 and analog 120 gains by the DSP 127. As the user selectable audio gain is varied the new user selectable audio gain is used to compute the new dynamic offset.

In addition to the volume dependency of the echo suppression algorithm, the present invention provides for the dynamic movement of the doubletalk threshold. This aspect of the invention aims to improve the doubletalk performance in the presence of variable background noise (such as hand free operation of a telephone in a car). This aspect is accomplished by utilizing the available R0 parameter (level of background noise) that is sent from the second communication device 130 as part of the CN frame. The adaptive doubletalk threshold monitors this R0 parameter and adjusts the doubletalk threshold appropriately to alleviate the excessive muting that occurs with noisy environments. In other words, to avoid unnecessary echo suppression due to an increase in the background noise (R0 in the CN), the present invention adjusts the echo suppression threshold based on the level of R0. As the background noise increases, the threshold is lowered and vice-versa. In this manner, the echo suppression adapts to the listener device's background noise so that they will not hear the choppy or muted effects of the prior art echo suppression routines. In other words, the echo suppression is accomplished while distinguishing the background noise from the audio received from the second communication device.

What is claimed is:

1. A communication device, comprising:
  a receiver for receiving a radio frequency signal from a second communication device to produce received samples therefrom;
  a decoder for decoding the received samples to produce a received audio signal having an amplitude and a noise parameter corresponding to the level of noise at the second communication device;

a noise estimator coupled to the receiver for estimating the background noise at the second communication device using the noise parameter;

an audio output device for presenting the received audio signal to a user;

a transmitter for transmitting transmit samples;

an encoder coupled to the transmitter for generating transmit samples;

an audio input device coupled to the encoder for providing transmit audio signals thereto; and an echo suppressor coupled to the audio input device and responsive to the noise parameter for minimizing the effect of the received audio signal on the audio input device in order to provide for improved full duplex operation of the communication device.

2. The communication device of claim 1, further including a control device coupled to the receiver for selectively altering the amplitude of the receive audio signal.

3. The communication device of claim 2, wherein the control device includes a volume control device.

4. The communication device of claim 2, wherein the control device includes an amplifier.

5. The communication device of claim 1, further including an echo detector.

6. The communication device of claim 1, further including a noise generator for generating noise to be coupled to the transmitter when no transmit audio signal is available.

7. The communication device of claim 5, further including a Discontinuous Transmission (DTx) mode activator for receiving and decoding a DTx mode authorization signal, wherein the noise generator is responsive to the DTx mode activator and activated in the absence of such an authorization signal.

8. A communications device, comprising:

a receiver for receiving frames of encoded audio from a second communication device;

a noise estimator coupled to the receiver for estimating background noise at the second communication device by analyzing a noise parameter received from the second communication device;

an audio input path;

an audio output device;

an audio output path for coupling the receiver to the audio output device;

a voice activity detector (VAD) for detecting voice on the audio input path;

an echo detector responsive to the voice activity detector for detecting unwanted echo on the audio input path resulting from acoustic coupling between the audio input and output paths; and an echo suppressor responsive to the echo detector and the noise parameter for selectively and variably, based on the background noise at the second communication device, inhibiting transmission of encoded audio from the audio input path in the presence of voice which is indicated as echo by the echo detector.

9. The communication device of claim 8, wherein the audio output device includes a speaker.

10. The communication device of claim 8, wherein the audio input path includes a microphone.

11. The communication device of claim 8, wherein the audio output path includes a controller for controlling the level of audio presented to the audio output device.

12. The communication device of claim 11, wherein the controller includes a volume control device.

13. The communication device of claim 11, wherein the controller includes an amplifier.

14. The communication device of claim 8, further including a noise generator for generating noise to be coupled to the transmitter when no transmit audio signal is available.

15. The communication device of claim 14, further including a Discontinuous Transmission (DTx) mode activator for receiving and decoding a DTx mode authorization signal, wherein the noise generator is responsive to the DTx mode activator and activated in the absence of such an authorization signal.

16. In a communication device having an audio output path and an audio input path, a method for minimizing the transmission of audio signals coupled from the audio output path to the audio input path, comprising:

receiving frames of encoded audio including a noise parameter corresponding to the background noise at a second communication device;

decoding the frames of encoded audio to produce audio signals;

estimating the background noise at the second communication device utilizing the noise parameter:

coupling the audio signals to an audio output device;

detecting signal energies associated with the audio signals on the audio input path; and suppressing echo while monitoring the background noise of the second communication device in order to avoid false suppression.

17. The method of claim 16, further including the step of generating noise and transmitting same when the transmission of an audio signal is not desired.

18. In a communication device having an audio output path and an audio input path, a method for minimizing echo that result from the transmission of audio signals coupled from the audio output path to the audio input path, comprising:

receiving frames of an encoded signal including a noise parameter corresponding to background noise at a second communication device;

decoding the encoded signal to produce an audio signal estimating the background noise at the second communication device using the noise parameter;

setting a doubletalk threshold based on the audio signal level;

altering the threshold commensurate with changes in the background noise; and suppressing echo while distinguishing the background noise from audio signal.

* * * * *